Patented Apr. 16, 1935

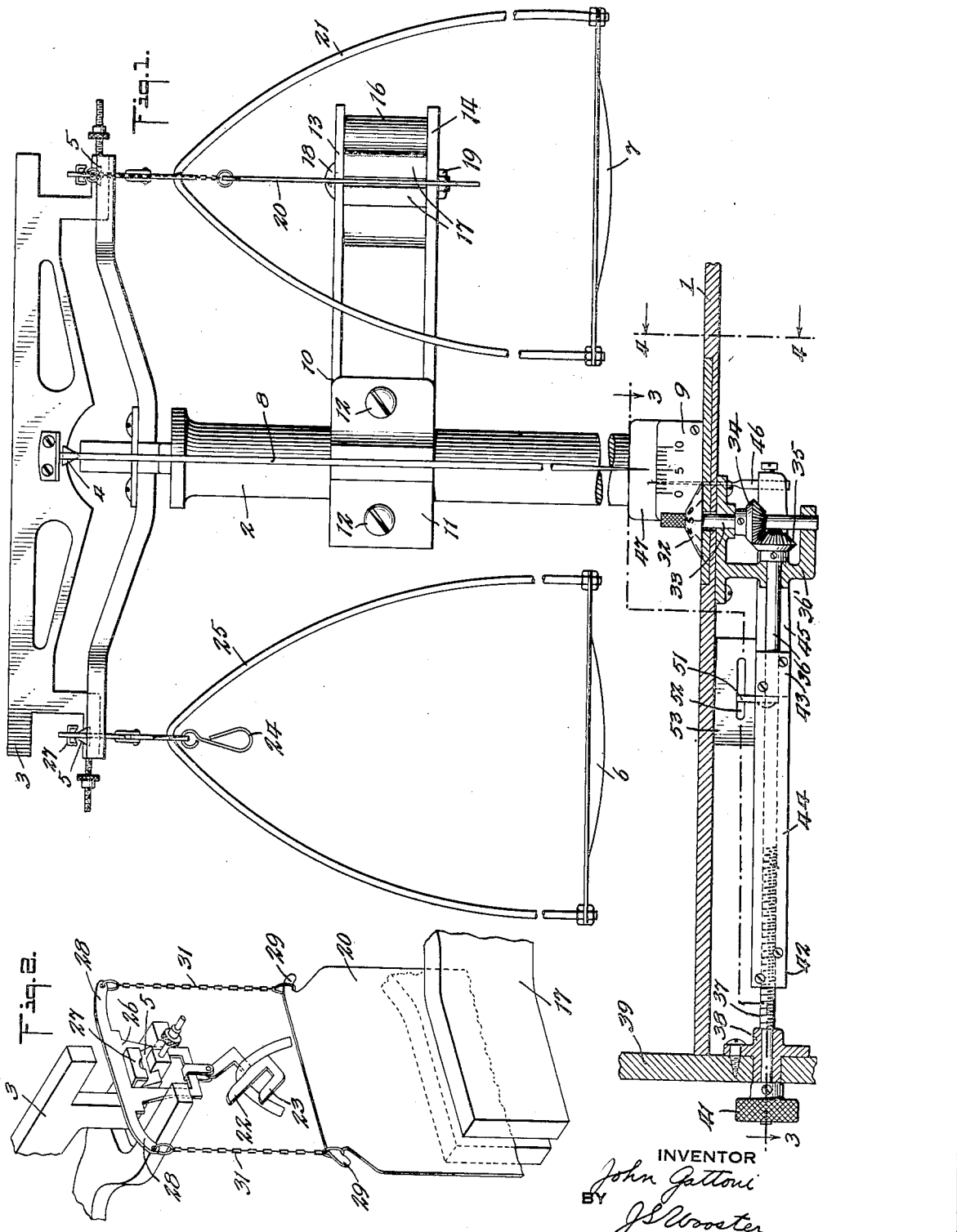

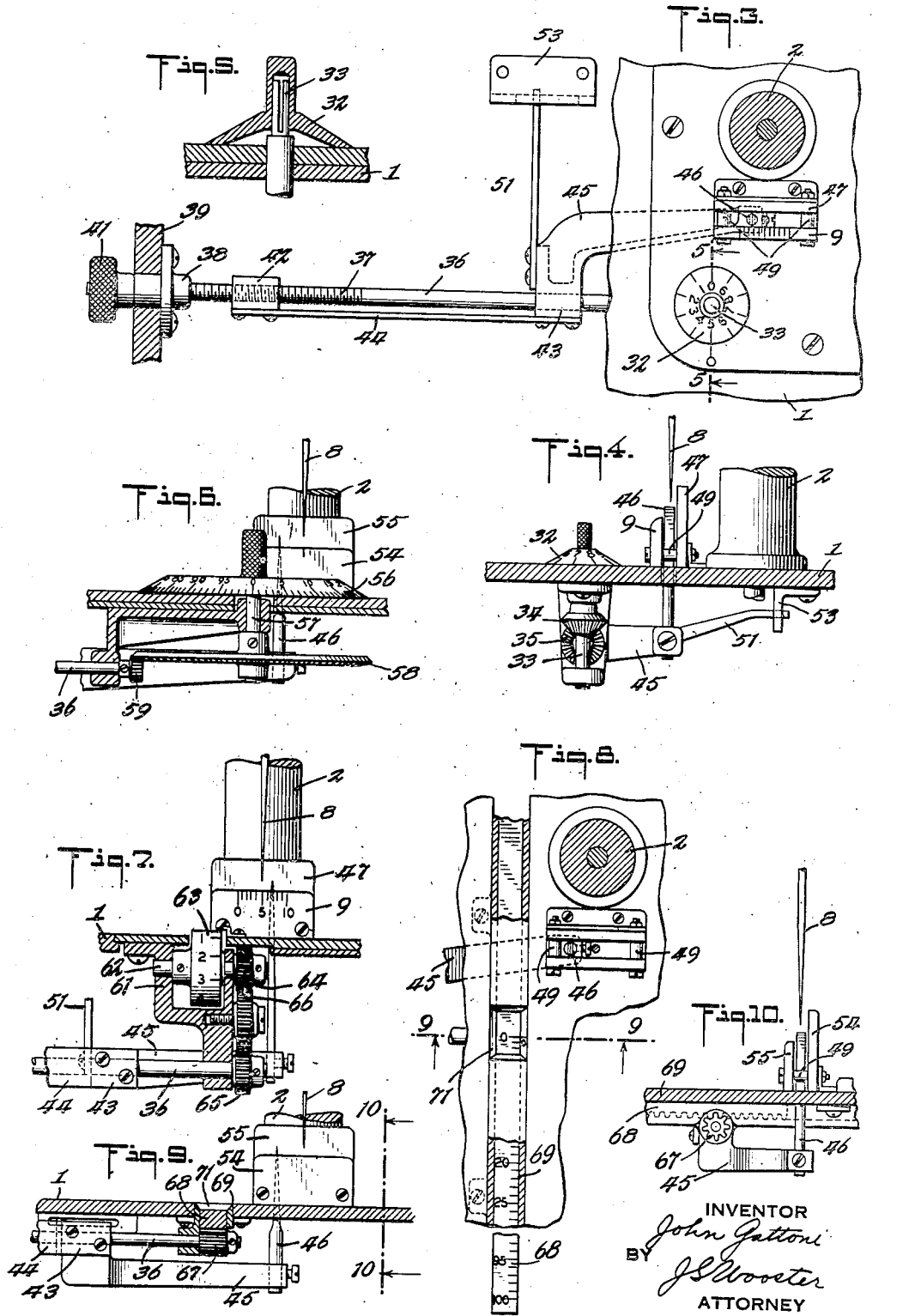

1,997,636

UNITED STATES PATENT OFFICE 1,997,636

PRECISION BALANCE

John Gattoni, Union City, N. J., assignor to Seederer-Kohlbusch, Inc., Jersey City, N. J., a corporation of New Jersey Application August 24, 1932, Serial No. 630,229

9 Claims. (Cl. 265—54)

This invention relates to a precision balance, and more particularly to a precision balance having a micrometer index and magnetic damping.

An object of the invention is to provide means for quickly and accurately weighing various objects of relatively small mass.

Another object is to provide means for easily obtaining very fine and delicate readings.

The invention is particularly applicable to sensitive laboratory and analytical balances which are used for measuring very light weights. In ordinary undamped balances of this type the beam oscillates freely and it frequently takes five minutes or longer for the scale pans and indicator to come to rest during a weighing operation. Some operators never wait for the pans to come to rest, but simply count the divisions on opposite sides of the zero line traversed by the indicator, and take the mean, which is at best an uncertain and inaccurate method of weighing.

I overcome these difficulties by providing an improved index and an improved combination of pivoted beam, magnetic damper and index, which enables delicate and accurate readings to be taken in a fraction of the time heretofore required. The balance is preferably of the type disclosed and claimed in my Patent #1,900,641 dated March 7, 1933, comprising a pivoted beam carrying a suspended scale pan, a magnet having closely spaced poles mounted between the beam and scale pan, and a damping plate pivotally suspended from the beam independently of the scale pan and adapted to move between the poles of the magnet to dampen vibrations of the beam whereby swinging movements of the scale pan are isolated from the damping plate. The beam carries a pointer or indicator and in combination with said indicator I provide a movable dial and means for quickly moving said dial into operative relation with said indicator to give a clear reading of the weight at almost the instant the indicator comes to rest, which is about ten or fifteen seconds from the time the beam starts oscillating.

In my preferred combination, in addition to the main indicator which is carried by the pivoted beam, I provide a second indicator which is adapted to cooperate with the main indicator, an operating member for moving the second indicator into cooperation with the main indicator, and means actuated by said operating member for moving the dial from which the readings are taken. When the first or main indicator comes to rest the operating member is moved to bring the second indicator into alignment with the main indicator, which can be accomplished almost instantaneously, after which the operator simply reads the weight from the dial which may be a disc, drum, sliding scale or other calibrated device.

In some forms of the invention I provide a micrometer dial in combination with a stationary scale which is mounted adjacent the main indicator and shows the position at which said indicator comes to rest. In such case the readings are taken from both the stationary scale and the dial, the divisions on the dial being a fraction of those on the scale. My balance is preferably mounted in a casing of the type having a glass door which is closed to exclude air currents during the weighing operation and my combination has the important advantage of enabling the dial and associated mechanism to be controlled entirely from outside the casing and the readings to be taken by merely glancing through the glass door without changing the operator's position or straining his eyesight. These and other features and advantages of the invention will be apparent from the following description.

Referring now to the drawings,

Fig. 1 is a front elevational view, partly in section of a balance;

Fig. 2 is a perspective view of the damping plate and associated parts;

Fig. 3 is a horizontal sectional view on the line 3—3 of Fig. 1;

Fig. 4 is a vertical sectional view on the line 4—4 of Fig. 1;

Fig. 5 is a vertical sectional view on the line 5—5 of Fig. 3;

Fig. 6 is an elevational view, partly in section, of a modification of the graduated dial;

Fig. 7 is an elevational view, partly in section, of another modification of the invention;

Fig. 8 is a horizontal sectional view of another modification of the invention;

Fig. 9 is a vertical sectional view on the line 9—9 of Fig. 8; and

Fig. 10 is a vertical sectional view on the line 10—10 of Fig. 9.

In Figs. 1-5, 1 is a suitable base on which is mounted a support 2, on the upper end of which the beam 3 is mounted on the usual knife edge 4. The beam carries knife edges 5 at its ends on which are hung the scale pans 6 and 7. Also attached to the beam is the usual indicator 8 moving over graduated scale 9.

10 is a curved magnet supporting arm clamped to support 2 and cap 11 by screws 12, so as to be adjustable vertically as well as horizontally.

The end of arm 10 is divided to provide separate clamping plates 13 and 14 between which a permanent magnet 16 having poles 17 is adjustably clamped by set screw 18 and nut 19. The ordinary adjustment will be to move the magnet back and forth gradually relatively to the damping plate 20 so as to get the latter symmetrically of the field where maximum damping effect is wanted and asymmetrically of the field where less damping effect is required. The poles of the magnet are closely spaced to provide a concentration of flux in the path of the damping plate. The scale pan 7 is supported by a bow 21, which is suspended from knife edge 5 in any suitable manner. Preferably, it is hung on an upper hook 22, which may be on the same end of the beam as damping plate 20, and if a magnet is only used at one end of the beam, then the lower hook 23 over pan 6 will carry a small weight 24 to balance the damping plate 20. 25 is the corresponding bow for pan 6 which is hung on hook 22 directly above hook 23 which carries weight 24.

Each double hook 22—23 is attached to a yoke frame 26 which carries agate bearing 27 resting on knife edge 5 at the end of the beam.

The yoke frame 26 above pan 7 carries extensions 28 from which the damping plate 20, having hooks 29, is suspended by light chains 31, as little mass as possible being desirable in this moving system.

A micrometer dial 32 having ten equal graduations is mounted on a vertical split shaft 33 (see Fig. 5) and is retained in position by friction. The shaft 33 carries at its lower end a bevel gear 34, adapted to mesh with a second bevel gear 35 carried by a longitudinal shaft 36. Vertical shaft 33 and horizontal shaft 36 are supported by bracket 36', and bevel gears 34 and 35 have a 1 to 1 ratio. The horizontal shaft 36 has a threaded portion 37, passes through a bushing 38 secured to casing 39, and carries a knurled knob 41 outside the casing. A block 42 is threaded on shaft 36, and a second block 43 is movable on the plain portion of shaft 36. Strip 44 connects blocks 42 and 43. Block 43 carries a curved arm 45, and has at its free end a vertical indicator 46 which passes between plate 47 and graduated plate 9. The plates 47 and 9 are separated by spacers 49 and are secured to the base 1. To prevent blocks 42 and 43 from turning, arm 51 is secured to curved arm 45 and engages a slot 52 in angle iron 53 mounted on base 1.

Oscillations produced upon weighing an object are quickly damped by the action of damping plate 20 moving in the field of the magnet 16. When indicator 8 comes to rest at some position between 0 and 10 on graduated scale 9, shaft 36 is rotated, causing connected blocks 42 and 43 to move arm 45 until indicator 46 is brought in alignment or cooperation with indicator 8. The rotation of the shaft 36 also causes graduated dial 32 to rotate relatively to indicators 8 and 46, by means of bevel gears 34 and 35, and shaft 33. Readings are then taken on scale 9 and dial 32 in accordance with the usual practice, the divisions on dial 32 being one-tenth those on scale 9.

In Fig. 6 plates 54 and 55 are not graduated, but dial 56 has 100 equal divisions. The dial 56 is mounted on vertical shaft 57, which carries a gear 58 adapted to mesh with gear 59 carried by shaft 36. The ratio of gear 59 to gear 58 is 1 to 10. To obtain readings, indicator 46 is brought in alignment with indicator 8, and the reading is obtained solely from dial 56.

In Fig. 7 a bracket 61 suspended from base 1 carries a shaft 62, upon which is mounted a dial in the form of a drum 63 having 10 equal graduations. Shaft 62 also carries gear 64, and a horizontal shaft 36 carries a gear 65. An idler gear 66, mounted on bracket 61, meshes with gears 64 and 65. In this embodiment, readings are obtained as in Figs. 1 to 5.

In Figs. 8, 9 and 10, shaft 36 carries a pinion 67 which meshes with a horizontally movable rack 68 having 100 equal graduations. A housing 69 having a transparent window 71 substantially encloses rack 68. Readings are obtained from the rack by bringing the indicator 46 in alignment with indicator 8. It will be evident that rack 68 may be mounted to move in a vertical plane if desired.

In the foregoing balances the damping plate 20 moves up and down between the poles of the magnet and the eddy currents set up by moving the plate through the field dampen the motion of the beam and quickly bring the pans and the indicator 8 to rest. The yoke frame supports the damping plate and the adjacent scale pan independently and out of contact with each other so that swinging movements of the scale pan are isolated from the damping plate and cannot force the damping plate against the magnet poles which would seriously affect the sensitivity and accuracy of the balance. At the instant the indicator 8 comes to rest the operator, by a simple and almost instantaneous movement of the dial control mechanism from outside the casing 39, effects the required adjustment and takes the exact reading without having to take a mean, and without even changing his position.

It will be understood that various modifications and changes may be made without departing from the scope of the invention as indicated in the accompanying claims.

The invention claimed is:

1. In a balance, an indicator, a second indicator adapted to cooperate with said first indicator, a dial separate from said indicators, an operating member for moving said second indicator into cooperation with said first indicator, and means operated by said member for actuating said dial.

2. In a balance, a pivoted beam, an indicator carried by said beam, a second indicator movable into cooperation with said first indicator, a dial separate from said indicators, an operating member for moving said second indicator, and means operated by said member for actuating said dial.

3. In a balance, a pivoted beam, an indicator carried by said beam, a second indicator movable into cooperation with said first indicator, a rotatable dial adapted to rotate relatively to said indicators, an operating member for moving said second indicator, and means actuated by said operating member for rotating said dial.

4. In a balance, a pivoted beam, an indicator carried by said beam, a graduated scale cooperating with said indicator, a second indicator movable into cooperation with said first indicator, a micrometer dial separate from said indicators, an operating member for moving said second indicator, and means operated by said member for actuating said micrometer dial.

5. In a balance, a pivoted beam, an indicator carried by said beam, a graduated scale cooperating with said indicator, a vertical shaft having a gear, a graduated dial mounted on said shaft, a horizontal shaft having a threaded portion, a second gear carried by said horizontal shaft and adapted to mesh with said first gear, a second indicator adapted to cooperate with said first indicator, and means threaded on said horizontal shaft for moving said second indicator.

6. In a balance, a pivoted beam, an indicator carried by said beam, a graduated scale cooperating with said indicator, a vertical shaft having a gear, a graduated micrometer dial mounted on said shaft, a horizontal shaft having a threaded portion, a second gear carried by said horizontal shaft and adapted to mesh with said first gear, a movable block threaded on said horizontal shaft, a second block movable on the plain portion of said horizontal shaft, means for connecting said blocks and for preventing them from turning, and a second indicator carried by said second block and adapted to coperate with said first indicator.

7. In a balance, a pivoted beam, an indicator carried by said beam, a graduated scale cooperating with said indicator, a second indicator movable into cooperation with said first indicator, a rotatable micrometer drum, an operating member for moving said second indicator, and means actuated by said operating member for rotating said drum.

8. In a balance, a pivoted beam, an indicator carried by said beam, a second indicator movable into cooperation with said first indicator, a graduated rack separate from said indicators, a rotatable shaft, means controlled by said shaft for moving said second indicator, and means carried by said shaft for moving said rack.

9. In a balance, a pivoted beam, an indicator carried by said beam, a graduated rack, a rotatable shaft having a threaded portion, means carried by said shaft for moving said rack, an arm threaded on said shaft and adapted to move longitudinally thereof when said shaft is rotated, and a second indicator carried by said arm and adapted to cooperate with said first indicator.

JOHN GATTONI.